April 10, 1928.
M. S. NEWMAN
FUR SHEARING MACHINE
Filed Dec. 22, 1924
1,665,217
4 Sheets-Sheet 4
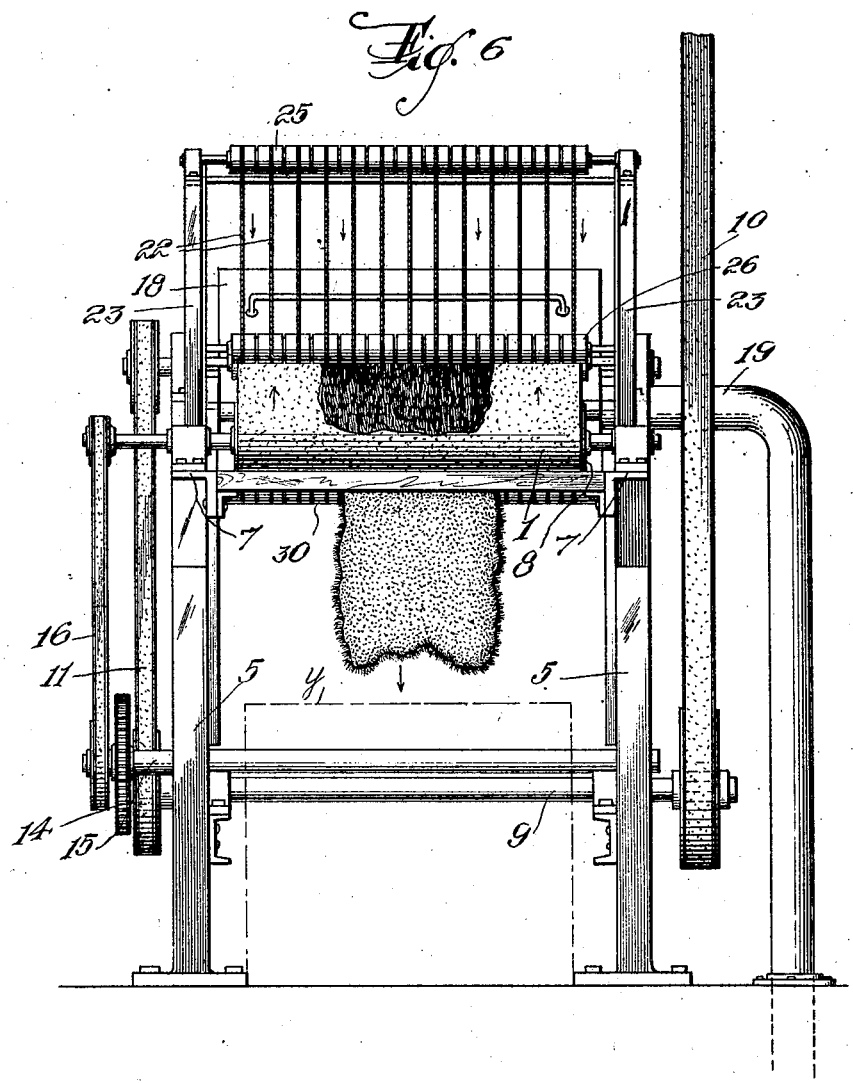

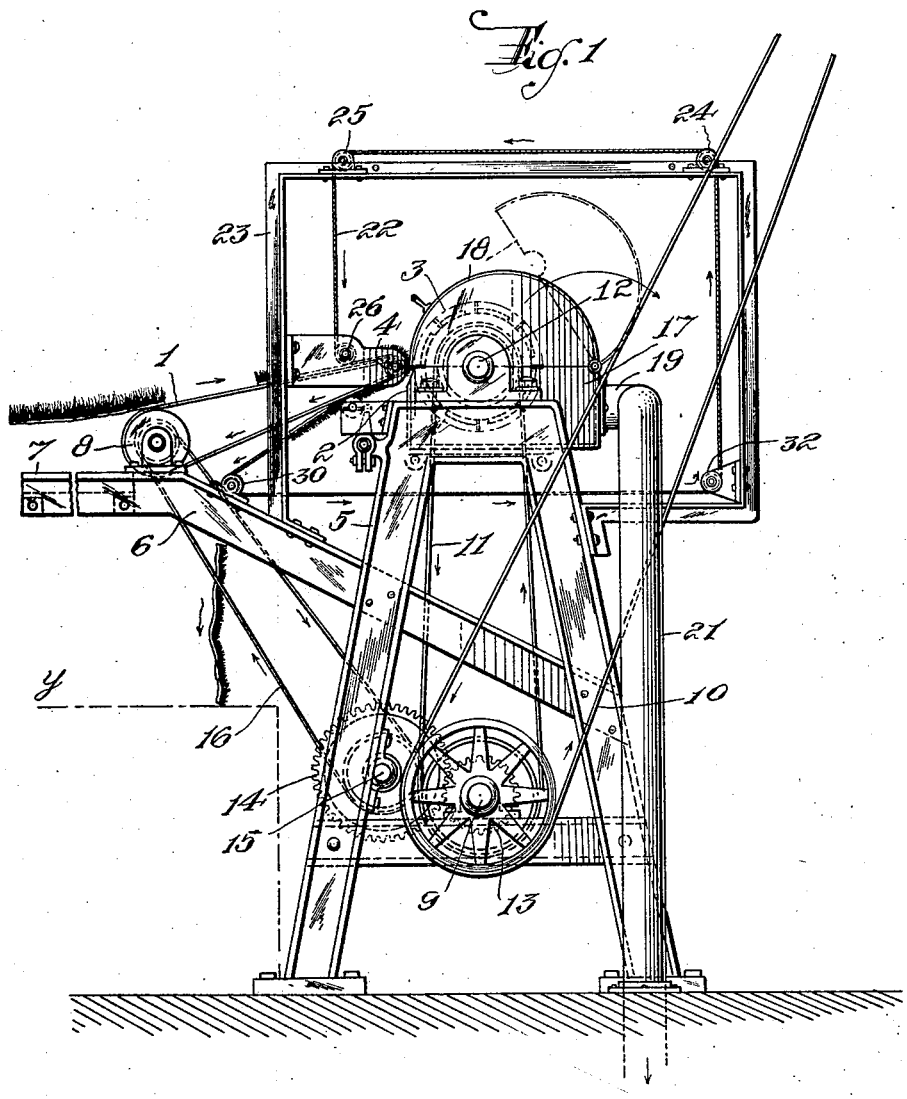

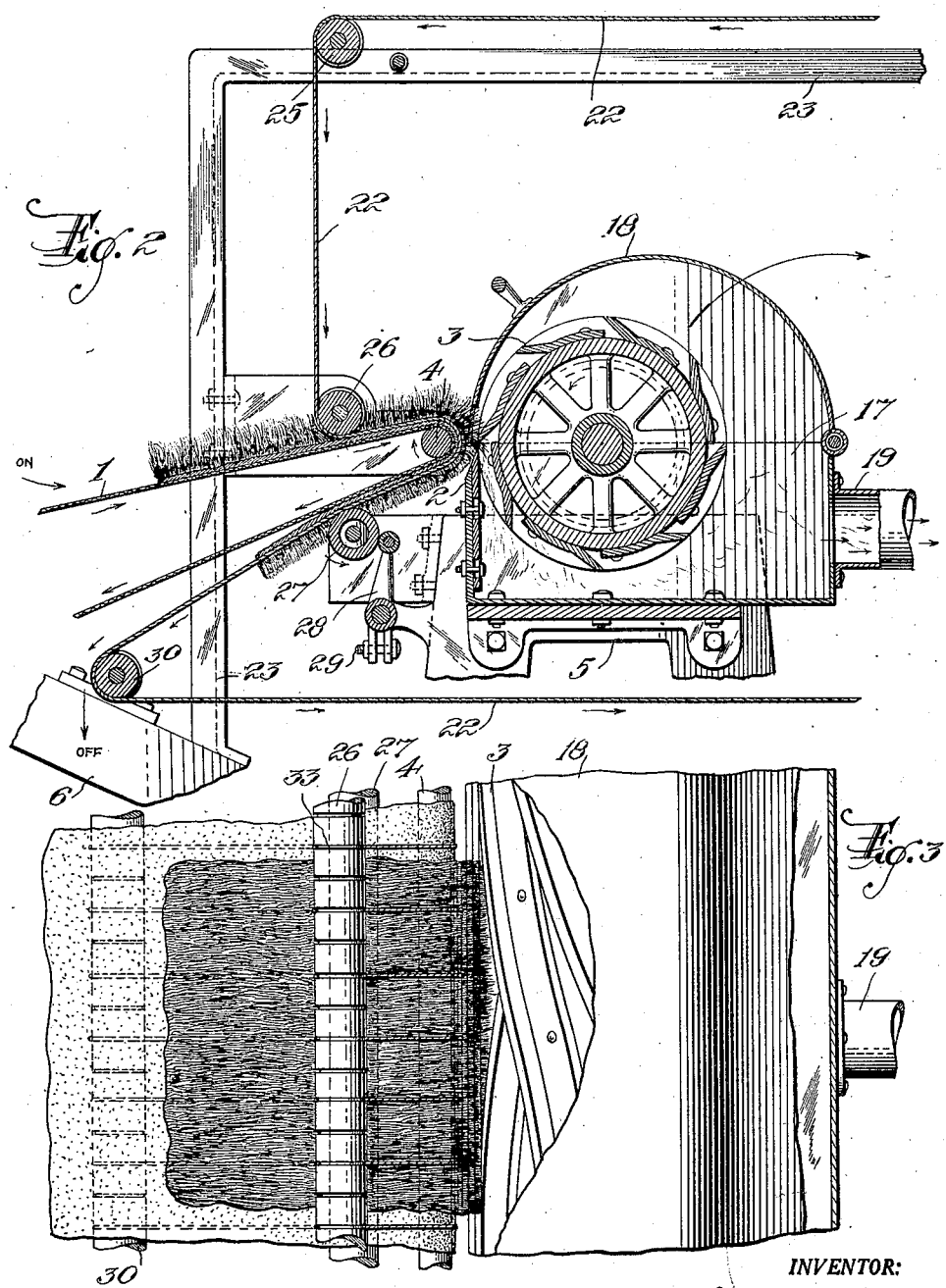

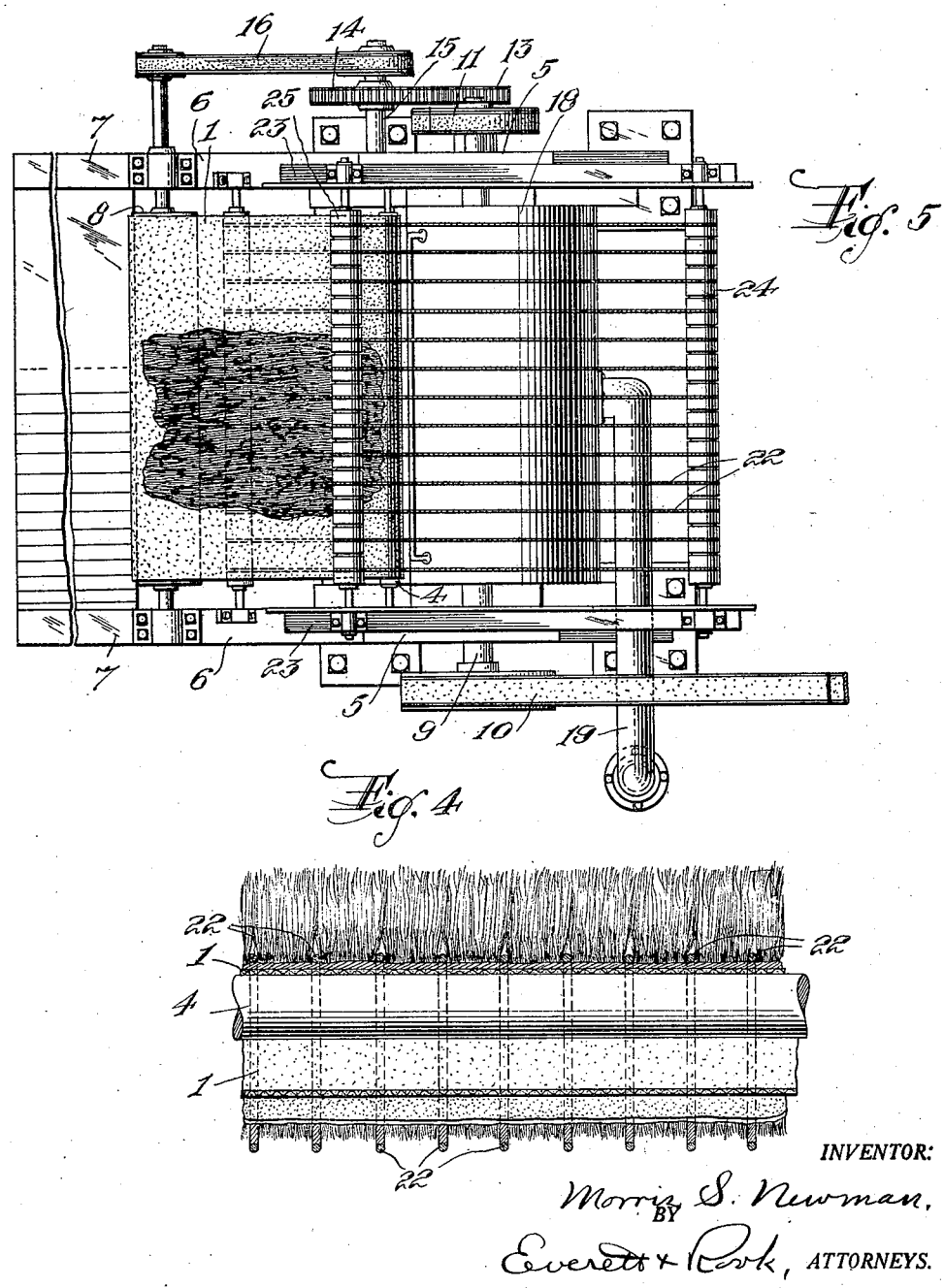

Patented Apr. 10, 1928.

1,665,217

UNITED STATES PATENT OFFICE.

MORRIS S. NEWMAN, OF MIDDLETOWN, NEW YORK.

FUR-SHEARING MACHINE.

Application filed December 22, 1924. Serial No. 757,458.

The objects of this invention are to enable small fur skins to be run through a shearing machine singly, rather than in a series sewed loosely together; to thus enable each skin to position itself naturally and properly, without being hampered by attachment to adjacent skins; to thus secure a perfect shearing of each skin and a high grade product; to simplify shearing the skins, and save time, labor and expense. To provide, for carrying out these objects, a fur shearing machine of suitable construction, and more particularly one which has suitable means for mechanically holding each skin on the conveyor while it is presented to the shearing knives; to employ such means which shall not interfere with or affect the shearing, and more particularly to use for the purpose cords which shall lie between the hairs; to secure such an arrangement of cords as will firmly hold each skin while it is being sheared, as well as feed and discharge the skins, and to obtain other advantages and results as may be brought out by the following description.

Referring to the accompanying drawing, in which the same numerals of reference designate corresponding and like parts throughout the several views, Figure 1 is an end view of a fur shearing machine embodying my invention, individual skins being shown one just starting onto the conveyor, another one being sheared, and a third one just leaving the machine;

Figure 2 is a cross-section of the upper part of the machine on a larger scale;

Figure 3 is a plan view of the middle portion of the shearing knives and means for presenting a skin thereto;

Figure 4 is a detail sectional view transversely of the conveyor illustrating how certain cords hold the skin thereon;

Figure 5 is a plan of the entire machine as shown in Figure 1, and

Figure 6 is a front elevation of the same.

In said drawings, 1 indicates an endless conveyor belt providing an apron or shelf on which the skins are fed to a cooperating stationary knife 2 and rotary knife 3, the conveyor passing around a breast roll 4 of small diameter next said shearing knives so as to sharply bend the skin and separate and extend the hairs, as is usual. In the particular fur shearing machine shown for purposes of illustration, there are side frames 5, 5, with forwardly projecting extensions 6, 6 to support a table 7 at the inner part of which is the outer end roller 8 for the conveyor 1. At the lower part of the side frames 5, 5 is a shaft 9 driven as by a belt 10 from a suitable source of power (not shown), and driving as by a belt 11 the shaft 12 upon which the rotary blades 3 are mounted. Said shaft 9 is shown having also a pinion 13 which meshes with a gear 14 on another shaft 15 from which one of the conveyor rollers, as 8, is driven as by a belt 16 to drive the conveyor. These particular forms of supporting and driving means are only illustrative, however, and others might be employed without affecting my invention.

The shearing knives 2, 3 are enclosed in a casing 17, the upper part 18 of which is hinged to form a cover which can be opened, and from the back of said casing leads a suction duct 19 which extends parallel to the casing and closely adjacent thereto as at 20 until it clears the machine and then turns downward through the floor as at 21.

In carrying out my invention I apply to the inner end portion of the conveyor 1 or end next the shearing knives 2, 3, spaced cords 22, also endless and traveling in the same direction as the said conveyor in such relation thereto as to hold the skins securely in place thereon, not only while being sheared but also while being fed to and discharged from the shearing knives. In the specific embodiment of the invention shown in the drawings, light supplemental frames 23, 23 are mounted upon the tops of the side frames 5, 5 to carry rollers over which the cords 22 pass, the direction of movement being forwardly over the rear and front top rollers 24 and 25. From said front top roller 25 the cords pass downwardly to a roller 26 adjacent the top of the apron or shelf formed by the conveyor 1 and at a distance from the inner end of said apron or shelf; after passing this roller 26 the cords lie normally in engagement with the conveyor 1 for its entire inner portion passing around the breast roll 4, being preferably held in suitable proximity to the under bight of the conveyor by an adjustable roller 27 at a distance from the breast roll 4 and adapted to be moved by swinging arms 28 with frictional clamping means 29. Beneath the conveyor 1 and beyond said roller 27, the cords 22 diverge at an acute angle from said conveyor to a roller 30 positioned sufficiently forward so that the skins will drop clear of the machine into a container indicated at 31, said roller 30 being also positioned low enough so that the cords 22 may extend horizontally rearward beneath the casing 17 and between the side frames 5, 5 to a lower rear roller 32 from whence said cords pass vertically upward to the rear top roller 24 already mentioned. The cords 22 diverge from the under part of the conveyor belt 1 at a very slight or acute angle thereto, and said diverging portions of both the conveyor belt and the cords are free, that is to say, they are not in engagement with pulleys or the like and are thus free to vibrate slightly as the machine is running and shake the skin so as to detach or separate from the conveyor belt and cause it to more positively follow the cords 22 to its point of discharge over the pulley 30.

The cords 22 are throughout their length spaced suitable distances and held parallel by grooves in the rollers as shown at 33 in Figure 3; they are driven by frictional contact with the portion of the conveyor 1 which forms the inner end of the apron upon which the skins are fed to the machine or with a skin upon said portion of the conveyor and driven thereby. Obviously the cords are fine enough so that they lie between the hairs of the first skin, as illustrated in Figure 4, without depressing or flattening any of them and thus said hairs are freely exposed to be sheared, while an individual skin is securely held against displacement. The operator has only to feed the skins onto the apron or receiving shelf formed by the conveyor, beneath the roller 26 and the cords passing therearound, when said skin will pass through the machine without further attention and be dropped off the cords as they pass over the lower front roller 30.

By my invention, therefore, it is not necessary to sew the skins loosely together as has been common heretofore in order to feed them through a fur shearing machine, the next adjacent skins to any particular skin being sheared serving to hold it in place during the shearing operation, but the skins may be fed singly. Each skin is thus allowed to naturally assume its smooth extended position and is not hampered by attachment to preceding and following skins, and thus not only is less skill required in feeding the skins to the machine but also more perfect shearing and a better product is secured.

It will be noted that the auxiliary frames 23, 23 are open-ended so as to permit access to the shearing knives, and preferably they space the rollers for the cords at a sufficient distance from the casing 17 to enable its cover 18 to be readily opened for inspection and so forth as usual. Said frames 23 are of substantially rectangular shape and are arranged in the planes of the side frames 5 of the machine. Obviously they may be made of any size desired to provide the necessary space at their ends for access to the shearing knives for adjusting or clearing the same of accumulated hair, enabling the cover 18 to be freely raised for this purpose, and providing ample space for the suction duct 19 from the casing.

Various detail structural modifications may be made by those skilled in the art in carrying out my invention, without departing from the spirit or scope thereof, and therefore I do not desire to be understood as limiting myself except as required by the following claims when construed in the light of the prior art.

Having thus described the invention, what I claim is:

1. In a fur shearing machine, the combination with shearing knives and an endless conveyor having a portion over which a skin is run in downward direction and sharply bent for presentation to said knives, of spaced cords extending longitudinally of said conveyor over said portion and having portions extending backwardly above and forwardly below the same, upper and lower rollers pressing said cords at the outer ends of their said portions against said conveyor at yieldable points of the conveyor, both said rollers engaging a skin as it is sheared and holding the cords against the skin and the skin against the conveyor, and means for driving the said conveyor.

2. In a fur shearing machine, the combination with shearing knives and an endless conveyor having a portion over which a skin is run in downward direction and sharply bent for presentation to said knives, of spaced cords extending longitudinally of said conveyor over said portion and having portions extending backwardly above and forwardly below the same, upper and lower rollers pressing said cords at the outer ends of their said portions against said conveyor at yieldable points of the conveyor, means for adjusting the lower roller toward and away from the conveyor to adjust the pull on the skin, and means for driving the said conveyor.

3. In a fur shearing machine, the combination with shearing knives and an endless conveyor having a sharply bent portion for presenting a skin to said knives, of a roller above said coveyor and a roller below it both transverse to the conveyor and spaced from said sharply bent portion, endless cords passing over said rollers and sharply bent portion, open-ended frames at the top of the machine affording access through their ends to the shearing knives, and other rollers in said frames for leading said endless cords around said shearing knives.

4. In a fur shearing machine, the combination with shearing knives, a casing for said knives and an endless conveyor for presenting a skin to said knives, of endless spaced cords extending longitudinally of that portion of the conveyor which presents the skins to the knives, open-ended frames at the top of the machine, a suction duct leading from said casing through the open end of one of said frames, and rollers mounted in said frames for leading the said endless spaced cords around said casing and duct.

5. In a fur shearing machine having side frames, the combination with shearing knives and an endless conveyor having a sharply bent portion for presenting a skin to said knives, of a roller above said conveyor, and a roller below it both transverse to the conveyor and spaced from said sharply bent portion, endless cords passing over said rollers and sharply bent portion of the conveyor, rectangular frames at the top of the machine substantially in the planes of the side frames thereof and having centrally open ends affording access therethrough to the shearing knives, and other rollers in said frames for leading said endless cords around said shearing knives.

MORRIS S. NEWMAN.